United States Patent [19]
Maiette et al.

[11] Patent Number: 4,983,809
[45] Date of Patent: Jan. 8, 1991

[54] RADIANT FLOOR TILE HEATER

[75] Inventors: Ralph L. Maiette, Wolcott; Stephen T. Starre, East Granby; Dayton C. Thomas, Sandyhook; Craig E. Crandall, Waterbury, all of Conn.

[73] Assignee: UAS Automation Systems, Inc., Bristol, Conn.

[21] Appl. No.: 388,019

[22] Filed: Aug. 1, 1989

[51] Int. Cl.[5] .................. H05B 3/00; B66C 1/02; B65G 49/00
[52] U.S. Cl. .......................... 392/407; 30/170; 156/272.2; 294/64.1
[58] Field of Search ............ 219/227, 228, 240, 533, 219/346, 354, 358, 494, 497, 345, 388; 294/64.1; 30/169, 170; 156/272.2, 344, 584, 499, 248; 198/689.1, 952

[56] References Cited

U.S. PATENT DOCUMENTS

| | | | |
|---|---|---|---|
| 2,655,976 | 10/1953 | Lovin . | |
| 2,694,135 | 11/1954 | Brockmole . | |
| 2,760,045 | 8/1956 | Blue | 219/533 |
| 3,400,244 | 9/1968 | Meltzer | 219/228 |
| 3,619,557 | 11/1971 | McClure | 219/228 |
| 3,643,992 | 2/1972 | Jacobucci | 294/64.1 |
| 3,956,612 | 5/1976 | Ballard et al. | 219/358 |
| 4,019,945 | 5/1978 | Patterson | 294/64.1 |
| 4,028,527 | 6/1977 | Thagard, Jr. | 219/330 |
| 4,221,620 | 9/1980 | Milne | 156/71 |
| 4,451,196 | 5/1984 | Harada et al. | 414/752 |
| 4,452,492 | 6/1984 | Grasse | 299/37 |
| 4,557,659 | 12/1985 | Seaglia | 294/64.1 |
| 4,577,092 | 3/1986 | Lenoir | 219/354 |
| 4,580,313 | 4/1986 | Blehert | 15/349 |
| 4,614,380 | 9/1986 | Allen | 299/41 |
| 4,690,724 | 9/1987 | Outlaw | 156/584 |
| 4,712,818 | 12/1987 | Borgman et al. | 294/64.1 |
| 4,720,227 | 1/1988 | Eberle | 414/32 |
| 4,749,219 | 6/1988 | Bolle, Jr. et al. | 294/64.1 |

FOREIGN PATENT DOCUMENTS

53-14286  2/1978  Japan .................. 219/494

*Primary Examiner*—Geoffrey S. Evans
*Attorney, Agent, or Firm*—Amster, Rothstein & Ebenstein

[57] ABSTRACT

Floor tiles, such as asbestos tile flooring, attached to the floor by thermoplastic adhesive are removed by using a radiant heater (30) made of a plurality of panels to radiantly heat the top surface of a plurality of tiles. To provide uniform temperature across the width of the tiles being heated, the panels along the sides of the heater are provided with a higher power density so that they are at a higher temperature. The heated tile thermally conducts heat to the thermoplastic adhesive beneath the tile causing the adhesive to soften, thereby allowing a set of vacuum cups (66) to pull a tile off the floor by suction and carry the tile into a container (24). Tile sensor (38) senses the temperature of the tile floor while heater sensor (40) senses the temperature of the heater (30), facilitating controlled removal of tiles from the floor. In a second embodiment of this invention, the heater is pivotally mounted so that when not in use the heater can be pivoted upward to protect the heater during transportation.

9 Claims, 5 Drawing Sheets

RADIANT FLOOR TILE HEATER

BACKGROUND OF THE INVENTION

The present invention relates to apparatus and method for heating floor tiles for removal from subflooring, and more particularly to such apparatus and method which is adapted to heat, lift and store asbestos floor tile without discharging asbestos particles into the air.

The heating of floor tiles to facilitate their removal from an underfloor or subfloor is well known. However, such heating has not been accompanied by the appropriate safeguards and techniques which would make the same useful in the removal of asbestos floor tile as well as more efficient in the removal of floor tile of other materials. First, all portions of the entire upper surface of the floor tile could not be heated simultaneously to bring the entire floor tile and the thermoplastic adhesive or mastic thereunder to a generally uniform temperature across its width and length. Such a thorough horizontal heating is necessary to enable removal of the tile as an unbroken intact unit from the underfloor which is particularly important when removing asbestos tiles. Second, the temperature of the heating means could not be varied to provide appropriate heating for a particular tile and mastic. Such a variable temperature heat control is desirable because particular tiles and mastics may differ in composition, thickness, and the like from one floor to another. Third, the temperature of the upper surface of the tile was not monitored continuously to insure that it did not exceed a predetermined level. Depending upon the composition of the particular floor tile and such other factors as the materials with which it has been waxed or otherwise treated, the tiles must be maintained below a particular temperature at which poisonous or otherwise hazardous or deleterious fumes (such as hydrogen chloride, vinyl chloride or the like) are produced. Additionally, where it is desired that the upper surface of the tile be maintained in a relatively smooth and unblistered state to facilitate its subsequent removal, as described hereinbelow, the temperature must be maintained below that which would produce blistering or bubbling of the upper tile surface. Fourth, a dwell period was not provided after heating of the tile was terminated but before an attempt was made to remove the tile from the underflooring. Such a dwell period is necessary in certain instances in order to achieve thorough vertical heating, i.e., to allow the heat to pass from the upper surface of the tile vertically through the thickness of the tile and into the mastic therebelow to ensure the desired thorough softening of the mastic, as well as thorough softening of the tile itself, so that the tile may be removed easily and handled intact during the removal process without breakage thereof.

The Asbestos Hazard Emergency Response Act of 1986 mandates the removal of asbestos-containing materials from schools, and there is pending legislation to expand the requirements to various commercial and public buildings. Once regarded highly for its fireproofing and insulating properties, asbestos is now in disfavor because high doses of asbestos particles (e.g., fibers or powders) have been found to scar the lungs, causing cancer and other diseases. Much of the asbestos material is used in a friable state in which the material can turn to particles under simple hand pressure, crumbling into microscopic fibers or powder that can float through the air.

Asbestos tile flooring, containing up to 20% by weight of asbestos, is typically placed on top of subflooring or underflooring, which may consist of concrete or wood, using a thermoplastic adhesive, called a mastic, to secure the tile in place on top of the subflooring. Conventional attempts to remove such tiles frequently result in the tile being broken into pieces so that asbestos particles are released into the air and contaminate the entire area. More particularly, the conventional method of removing asbestos tiles from the subflooring, so as to enable placement of new floor covering, consists of chipping the asbestos tile off the subflooring. Statutes, agency regulations, and simply a concern for the potential legal liability dictate that the work area be shielded with containment apparatus, that personnel dress in protective gear and wear masks, and the like, all of which increase the number of personnel and the time required per job site, and thereby the overall cost of the removal operation. Accordingly, there is a need for apparatus and methods for the removal of the asbestos floor tile in a manner which leaves the asbestos tile intact so that release of asbestos particles therefrom to the air is minimized. Additionally, the apparatus should further remove the tiles from the floor and stack them in disposable containers so as to minimize contact of the apparatus operator with the tiles.

It is a primary object of the present invention to provide apparatus for the heating of floor tile to facilitate its removal from underflooring with appropriate safeguards and techniques to provide a uniform, safe and thorough heating of the floor tile and the mastic securing it to the underflooring.

It is a particular object of the invention to provide a heater which insures uniform heating of the tiles over its entire surface area.

It is also an object of the present invention to provide apparatus for the heating, lifting and storage of floor tile from underflooring without breakage of the tile.

A further object of the invention is to provide such apparatus which not only removes the floor tile from the underflooring, but automatically relocates it into a disposable storage container.

Yet another object of this invention is to provide such apparatus which is especially suited for the removal of asbestos floor tile because it minimizes the discharge of asbestos particles into the air.

It is a further object of the present invention to provide such apparatus which is relatively simple and economical to manufacture, to maintain, and to operate.

SUMMARY OF THE INVENTION

In accordance with the foregoing objectives, the present invention, in its broadest aspects, facilitates removal of tiles secured to a subfloor by heating the tiles to a predetermined temperature and monitoring the temperature of the tiles to determine when the tiles reach the predetermined temperature. Thereafter, the tiles are removed from the subfloor. In one embodiment of the invention, the tiles are removed by a vacuum system which places suction cups into contact with the tiles after the tiles reach the predetermined temperature and which lifts the tiles from the subfloor and transfers them to a storage box for later disposal.

BRIEF DESCRIPTION OF THE DRAWING

The above brief description, as well as further objects and features of the present invention, will be more fully understood by reference to the following detailed description of the presently preferred, albeit illustrative embodiments of the present invention when taken in conjunction with the accompanying drawings wherein.

As one skilled in the art will recognize, the drawings have been simplified to exclude unnecessary detail and to focus on the inventive aspects of the floor tile remover.

DETAILED DESCRIPTION OF THE PREFERRED EMBODIMENTS

Referring now to FIGS. 1 through 5, therein illustrated is one embodiment of the floor tile remover according to the present invention, generally designated by the reference numeral 10. The floor tile remover 10 includes a frame 12 and cover panels 14 which cover the frame 12 and most of the functioning apparatus of the floor tile remover 10 both for aesthetic purposes and safety. To facilitate operator viewing of the full cycle of operation of the floor tile remover 10 and to enable the operator to more accurately situate the heater 30 (FIG. 2) over the tiles to be heated, the upwardly and rearwardly facing cover panels 14 are preferably transparent. The floor tile remover 10 is preferably about 27 inches wide so that it can fit through conventional 30 inch doorways, although clearly narrower and wider apparatus may be used where doorways of different sizes will be encountered. The frame 12 is mounted on two large front wheels 16 and a smaller back wheel 18 to enable the frame to be easily pushed around the floor by an operator acting on a handle 20 extending from the rear of the frame outwardly beyond the cover panels 14. The rear wheel 18 is preferably pivotably mounted to facilitate guidance of the apparatus by the operator. If desired, means may be provided for rendering the floor tile remover self-propelling, under the influence of the operator, but this is an expensive and unnecessary option.

Figure 2:
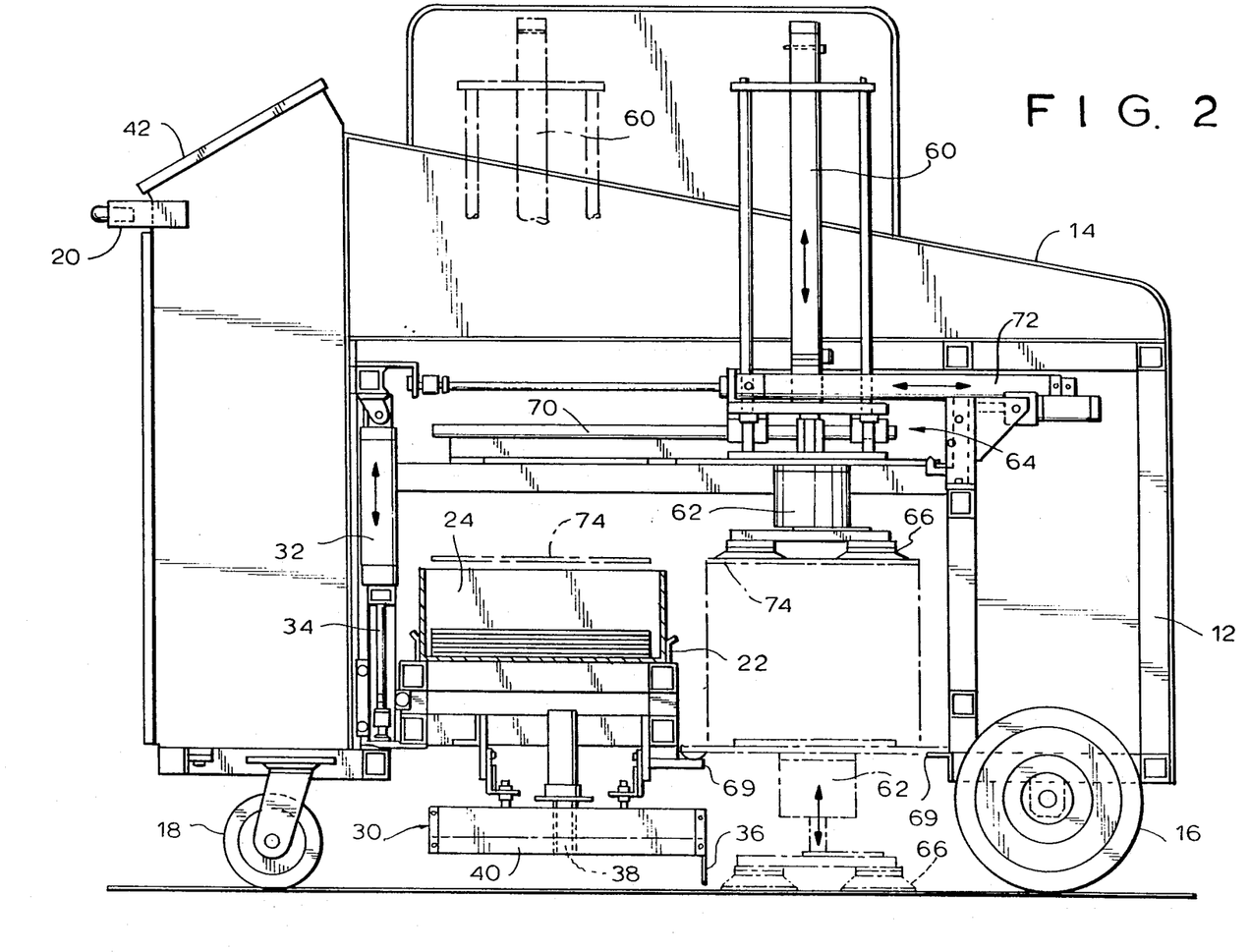
FIG. 2 is a side elevation view thereof partially cut away to reveal aspects of the floor tile remover.

Referring now in particular to FIG. 2, the frame 12 defines a platform 22 (which may have raised sides) for removably receiving a storage container 24 adapted to hold a plurality of tiles. Where the tiles are expected to contain asbestos fibers, the container 24 will be a suitable containment vessel so that, once the tiles are placed therein, asbestos fibers cannot escape the container. The container 24 is typically a cardboard storage device which rides on the platform 22 of the frame 12. When a container 24 is filled, one or more of the cover panels 14 are removed by the operator and the container 24 is lifted off the platform 22 and onto a floor by the operator. An accumulated group of the containers 24 may then be put on a pallet which, when filled, is subsequently shrink-wrapped with plastic and shipped to a suitable disposal site.

Disposed beneath the container-receiving platform 22 are means, generally designated 30, for heating a group of tiles on the subfloor to soften the tiles and any thermoplastic adhesive or mastic securing the tiles to the subfloor. Preferably, the heater 30 is comprised of a plurality of side-by-side elongate panels aligned along the axis of motion of the floor tile remover 10. Each panel is an infrared emitter strip independently connected to a common power supply. In order to enable the front of the heater 30 to closely approach a wall in front thereof, the electrical connections to each panel are disposed at one side thereof rather than at the front and rear thereof.

To facilitate transportation of the floor tile remover 10 to and from a work site without damage to the heater 30, the heater 30 is coupled to an upwardly biased pneumatic cylinder 32 which normally maintains the heater 30 spaced substantially above floor level (i.e., the upper surface of the tiles) where it is to a large degree protected by the frame 12 and cover panels 14. When the floor tile remover 10 is connected to an appropriate source of compressed air, as necessary for operation of the lifting and repositioning mechanism, the piston 34 of pneumatic cylinder 32 extends and lowers the heater 30 to its operative position closely adjacent the upper surface of the tile, preferably about 1 ¼ inches above. Of course, these details of this particular embodiment of the invention are not essential to the proper operation of a floor tile remover which is made in accordance with this invention.

It has been found in prior art floor tile removing machines that a uniform or thorough horizontal heating of the upper surface of the tiles was not achieved, thereby making removal of the tiles more difficult. This non-uniformity manifests itself particularly at the edges of the tiles and appears to be caused by, among other things, convention effects from cool air circulating about the periphery of the heater and conduction effects from the proximity of the other tiles about the group of tiles being heated, the other tiles tending to draw heat away from the periphery of the group of tiles being heated. This problem is corrected according to the invention by increasing the effective heating area of heater 30 to provide sufficient overlap by the heater 30 of the adjacent tiles, particularly to the front and rear of the group being heated, to effect a substantially uniform temperature along the axis of motion of floor tile remover 10. While enlargement of the width of the heater 30 (i.e., along the axis transverse to the axis of motion) is possible, limits on the ability of floor tile remover 10 to pass through doorways, through narrow isles, about posts, or columns and the like, make this less practical. Thus heater 30 preferably has an effective heating area of about 14 inches by 28 inches (14 inches along the axis of motion of floor tile remover 10 and 28 inches in width). As standard tiles are either 9×9 inches or 12×12 inches, the preferred heater can heat either three side-by-side 9×9 inch tiles or two side by side 12×12 inch tiles with sufficient overlap to promote uniform heating of the tiles.

To aid in providing uniform surface temperature across the width of the tiles, the panels or emitter strips at either side of the heater 30 are provided with a higher power density than the remaining or center panels therebetween so that they are at a higher temperature. For example, where the center panels of the heater 30 have a power density of preferably 11 watts/inch$^2$, the extreme side panels preferably have a power density of 14–15 watts/inch$^2$. As a result, the side panels or emitter strips are at a sufficiently higher temperature than the center panels therebetween to compensate for convection and conduction losses so that a uniform tile surface temperature is obtained across the effective width of the heater.

A thermally reflective shield 36 may be disposed closely adjacent one end of heater 30, which shield 36 extends essentially to the surface of the tile when the heater 30 is in the operative position. While the primary purpose of the shield is to protect the heat-sensitive vacuum cups 66 of the lifting element of the floor tile remover 10, as will be explained in further detail hereinafter, the proximity of shield 36 to the floor minimizes heat loss by convection at the one end of heater 30 and the reflective nature of the wall of shield 36 acts to concentrate the heat at the one end of heater 30 to compensate for thermal losses by conduction. Shield 36 may be formed of any suitable thin, thermally reflective material such as stainless steel.

Of significance to the invention is the use of tile sensor 38, which includes a temperature sensitive element such as a thermocouple located proximate the tile floor to sense the temperature of the tiles as they are heated and heater sensor 40 positioned in heater 30 to sense the temperature of heater 30. Sensing both the temperature of the tiles and the heater facilitates controlled removal of tiles from the floor and overcomes one disadvantage of prior art floor tile removal systems.

Figure 3:
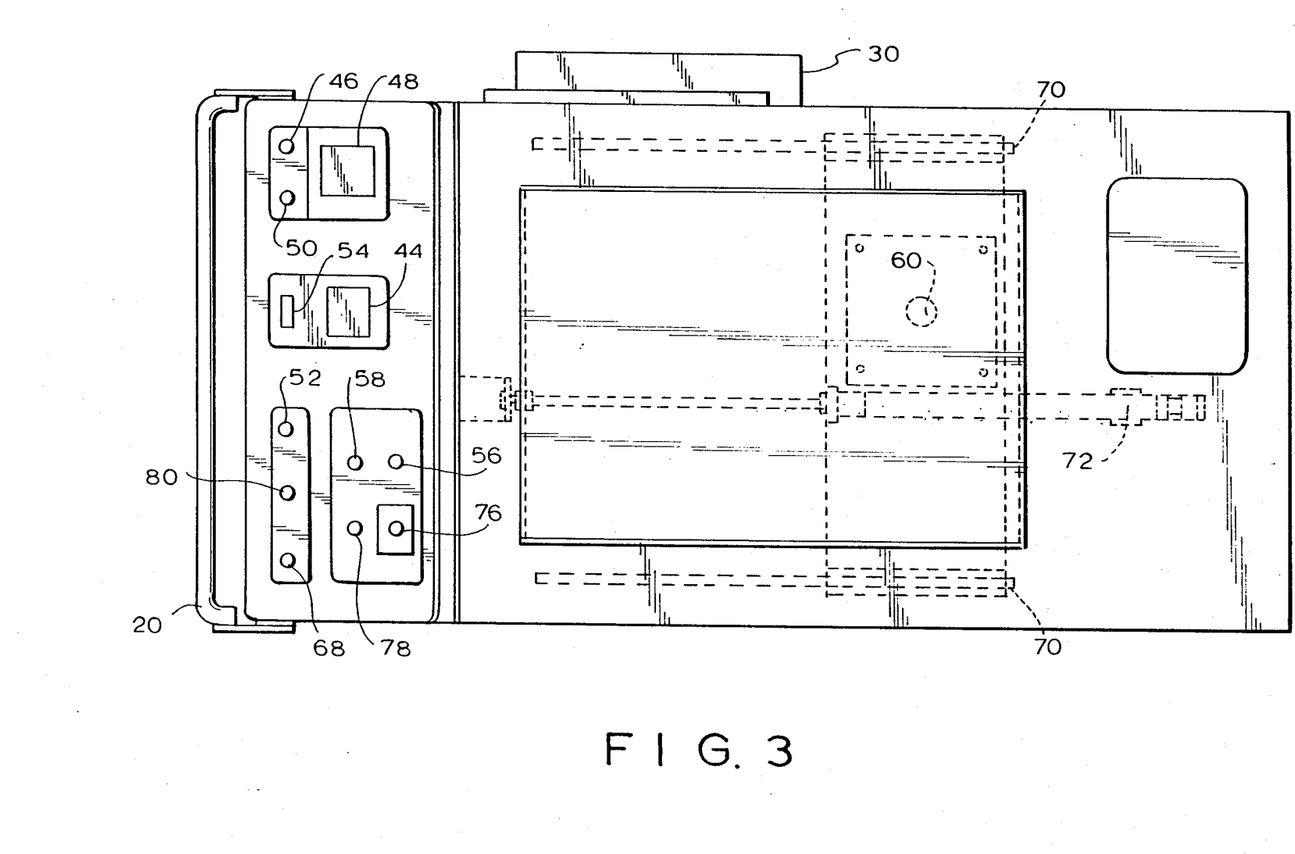
FIG. 3 is a top view of the floor tile remover of FIG. 1.
Figure 4:
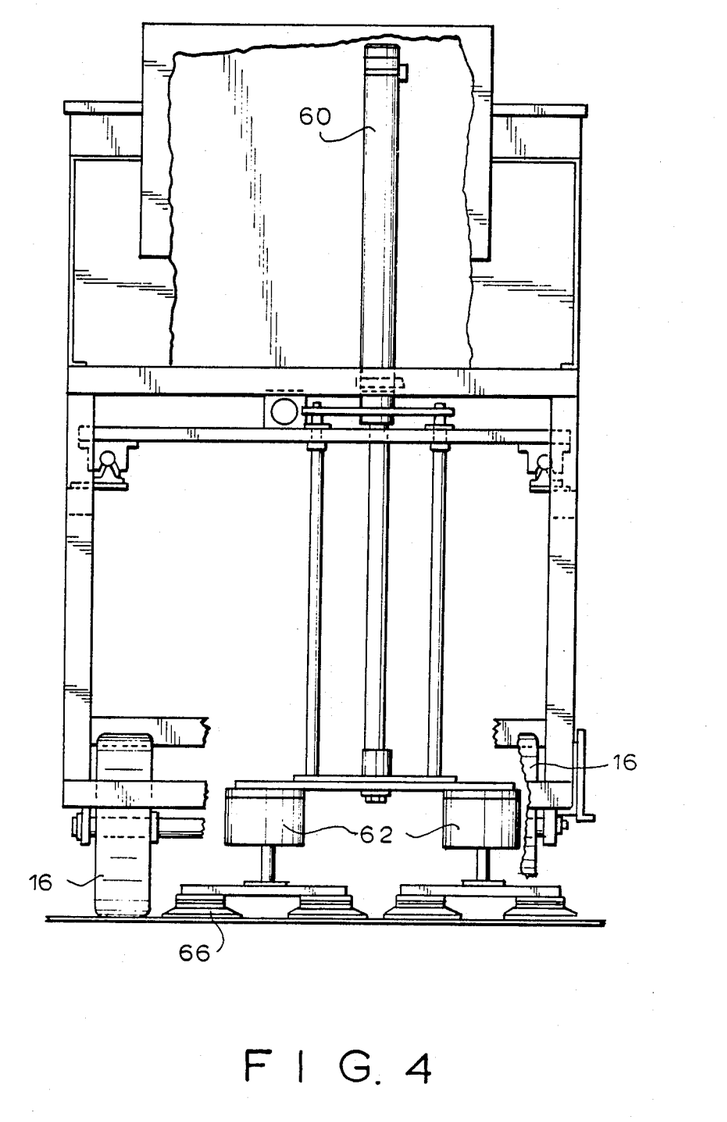
FIG. 4 of the invention is an end view of the floor tile remover partially cut away to show the vacuum system for lifting heated tiles from a subfloor.

Before describing other aspects of the invention, the tile heating operation will be described. Floor tile remover 10 has a control panel 42 which includes the necessary switches and indicators for operation of the floor tile remover 10. Referring now in particular to FIG. 3 as well, control panel 42 includes heater control 44 and heater on/off switch 46. Control panel 42 also has emergency power off switch 76 and an indicator 78 which is illuminated when the floor tile remover 10 is plugged in.

Once the heater on/off switch 46 is in the "on" position, the heater 30 remains activated except as noted hereinbelow. Heater control 44 includes a dial which permits setting of a desired temperature for the heater 30. Tile temperature control 48 includes appropriate switches for setting a maximum desired temperature for the upper surface of the tile being heated and, in response to signals received from tile sensor 38, turns off heater 30 automatically when the tile reaches the predetermined temperature. As indicated above, the operational controls also include heater sensor 40 disposed with respect to heater 30 to determine the heater temperature so that the heater 30 can be maintained thermostatically at the desired temperature. A conventional thermostatic control in the control circuit may be used to vary the power delivered to the heater as necessary to maintain the desired temperature. The tile sensor 38 is centrally disposed and in effect determines the temperature of the tile being heated. A microprocessor-based control circuit compares the temperature indicated by tile sensor 38 with the temperature set by tile temperature control 48 as the maximum desired temperature and indicates if the actual tile temperature as determined by the tile sensor 38, exceeds the maximum desired temperature. The indication of an excess tile temperature may be by illumination of an appropriate warning light 50 and/or the deactivation of the heater 30 either for a limited period of time or until it is reset intentionally by operator actuation of the heater on/off button 46. The actual control circuit is of conventional design and therefore need not be described in detail herein.

The temperature setting controls on control panel 42 may be simple mechanical means, such as rotary dials, or more complex electronic means including "increase temperature" and "decrease temperature" buttons associated with a digital display, the buttons being used to vary the temperature indicated by the display. The thermal sensors may be a thermocouple, optical pyrometer or the like. The setting and sensor functions may be performed by a conventional adjustable thermostatic control.

The ability to select a desired heater temperature and to sense the tile temperature enables the floor tile remover 10 to be adapted for use on tiles and thermoplastic adhesives of different compositions and thicknesses so as to achieve within an acceptable time frame (e.g., preferably 20–35 seconds) the most suitable temperature for softening of the tile and adhesive in view of the available voltages and other pertinent factors. The ability to set the maximum desired temperature for the upper surface of the tile enables the operator to ensure that the tile will not be heated to a temperature which will result in blistering or boiling of the upper surface thereof (which might render it unsuitable for later removal by the automatic lifting apparatus) or cause the formation of poisonous or otherwise undesired gases from the tile or the waxes used thereon. This ability to control and monitor the temperature of the tile is a significant improvement over prior tile removal systems.

In simpler and more economical embodiments, the apparatus for setting the maximum desired temperature for the upper surface of the tile may be replaced by a factory-set temperature setting, not accessible to the operator and hence not susceptible of abuse. For example, a preset temperature of 200° F. avoids blistering of asphalt tile surfaces and is also well below any temperature at which deleterious or otherwise undesired gas may be formed. If desired, a governor or limit may be provided even on operator-adjustable tile temperature setting means to insure that temperatures in excess of 400° F. are not accidentally set, as such temperatures substantially increase the likelihood of noxious gas release from the tiles.

Even after the floor tile has reached the desired softening temperature, additional time may be required to effect the desired thermal decomposition of the mastic agent. Alternatively, or in addition thereto, the top of the tile may be at the desired optimum temperature while the bottom of the tile may not be sufficiently hot (either due to the nature of the tile or the subflooring composition) so that the adhesive therebelow is not at the desired decomposition temperature. Accordingly, it may be desirable to provide a dwell period after heating of the tile for homogenization of heat throughout the tile (that is, the distribution of heat evenly throughout the tile) and the absorption of the heat by the mastic for a period of time sufficient to effect thermal decomposition of the mastic.

Control panel 42 additionally includes a resettable timer 54 which indicates the number of seconds elapsed since the last reset. Once the operator has determined by trial and error the appropriate heating period (during which the heater 30 should be disposed over the tile) and the dwell period (the period of time which should be permitted after the heater 30 is removed from the tile and prior to any attempt to lift the tile), the operator can employ timer 54 to insure the appropriate timing of each step. It will be appreciated, however, that timer 54, while useful to the operator, is not an essential part of the apparatus. On the other hand it will also be appreciated that the operator determines the optimum heating of tiles to soften them by timing the duration of the heating operation (preferably using timer 54) and that the tile temperature control 48 only determines the maximum desired temperature of the tile, typically well above the desired softening temperature. Control panel 42 also includes key on/off switch 56 for turning floor tile remover 10 on and off, as well as indicator lamp 58 to indicate that floor tile remover 10 is on.

The precise nature of heater 30 will depend upon the type of tile to be removed and the adhesive which was used to bond the tile to the underflooring. As asbestos is an excellent infrared (IR) heat absorber, capable of absorbing a large percentage (e.g., about 93%) of the infrared energy applied thereto and converting it into heat, a heater 30 intended for asbestos floor tile will typically utilize an IR source. It will be appreciated that in contrast to the conventional means for heating floor tiles, which rely primarily on conduction through the tile to heat the mastic, the present invention utilizes infrared radiation which penetrates the tile and heats the mastic by direct radiation. As a result, the mastic can be heated to a suitable temperature for release of the tile without any overheating of the tile which might result in bubbling of the tile upper surface, burning or the like. Other energy forms appropriate to the particular tiles and mastic may be used in place of infrared radiation, if desired.

Figure 5:
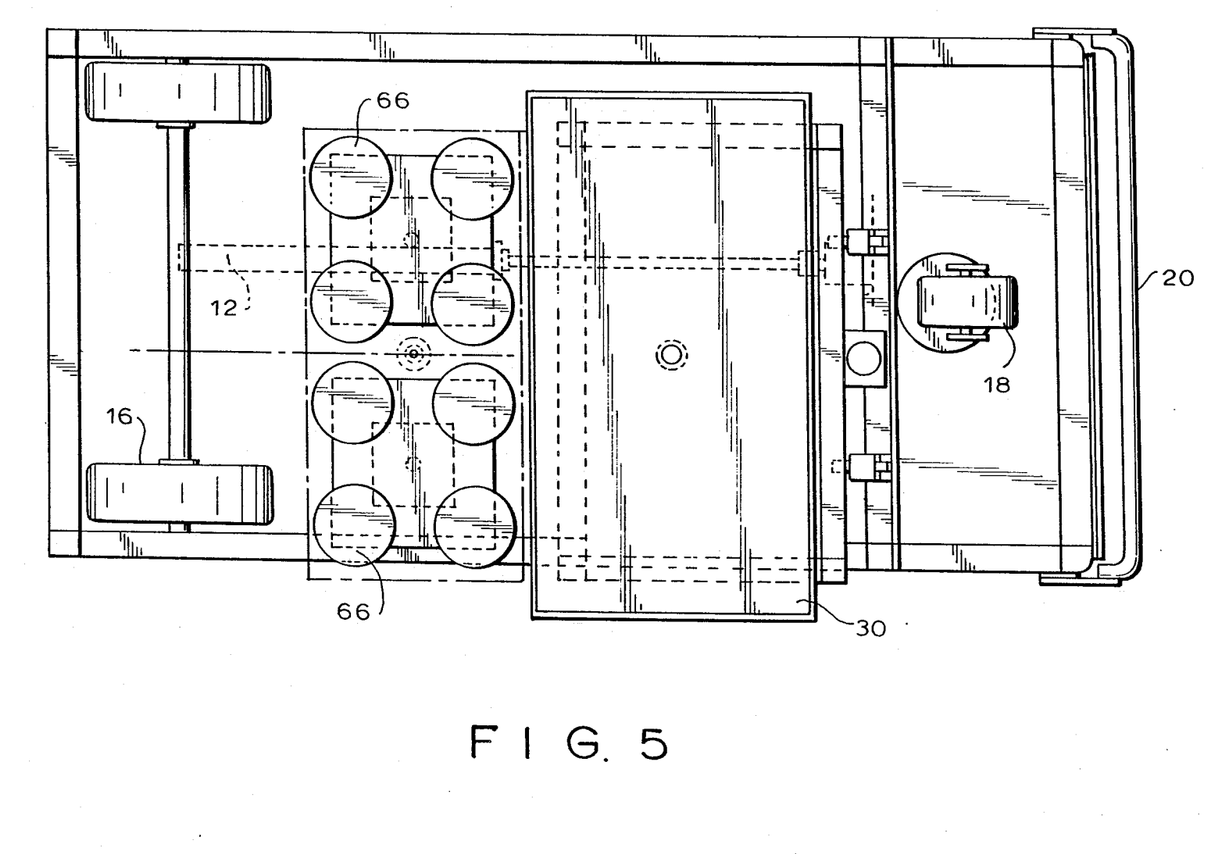
FIG. 5 is a bottom view of the floor tile remover of FIG. 1.

Referring now to FIGS. 2-5, the floor tile remover 10 in its more complex form additionally includes means for lifting each of the heated tiles and means for relocating the lifted tiles into the storage container 24. It has been found that a substantial force, typically about 400 lbs. of pull for a 9×9 inch tile and 550 pounds for a 12×12 inch tile, is required to remove a floor tile from the underflooring even after the adhesive bonding the tile to the underflooring has been heated. The lifting means includes a long stroke pneumatic cylinder 60 and a plurality of short stroke pneumatic cylinders 62 to achieve sequential lifting. Long stroke cylinder 60 is relatively fast acting and may have a stroke length of about 17 inches and an internal diameter or bore of about 2 inches. Short stroke pneumatic cylinders 62 are heavy duty and may have a stroke length of about 3 inches and an internal diameter or bore of about 3.25 inches. A plurality of vacuum cups 66 secured thereto are adapted to engage a tile at four widely spaced points on the edges thereof simultaneously. Where the tiles are 12×12 inches, the heater 30 will have heated two side-by-side tiles and a head 64 having two short stroke cylinders 62 and two sets of four vacuum cups 66 are employed, one vacuum cup set per cylinder, as best seen in FIG. 5. Where the tiles are 9×9 inches, the heater 30 will have heated three side-by-side tiles and a head having three short stroke cylinders and three sets of vacuum cups are employed, one vacuum cup set per cylinder. Various combinations of vacuum cups can be used. For example, to lift 9×9 tiles, each set of vacuum cups can have eight cups, four relatively large cups in the corners and four smaller cups, each of which smaller cups is disposed intermediate and slightly inwardly or centrally of a pair of the larger cups. As another feature, the removable head 64 connected to the piston of long stroke cylinder 60 by four screws (not shown), with quick connect/disconnect connectors being used to connect the pressure and vacuum lines to the remainder of the floor tile remover 10. Accordingly, if 9×9 inch or 12×12 inch tiles are encountered, a current 12×12 or 9×9 type head is easily and rapidly replaced by a 9×9 or 12×12 type head.

Each set of vacuum cups 66 is connected to a separate vacuum source of about 29 inches Hg, the vacuum in each instance being produced from the compressed air (about 100 psi at 6 CFM) by a Venturi effect. The vacuum cups are appropriately sized and positioned so that together they pull a tile upwardly with about 600 pounds of force. As the vacuum cups of the 9×9 inch type head are exposed to the same vacuum as the vacuum cups of the 12×12 type head, the vacuum cups of each set of the 9×9 type head are appropriately sized and positioned so that together they pull a tile upwardly with about 450 pounds of force. Clearly a variety of other configurations may be used for each set of vacuum cups on a head, the critical factor being that the cups are disposed so as to lift each tile from at least four widely spaced points on the edges thereof simultaneously.

The before described lifting apparatus provides two sequential lifts to the tiles. Once the operator has allowed the desired dwell period (if any) to elapse on the timer, he initiates the lifting sequence by pressing a tile lifter button 68 on the control panel. The compressed air enters both the long and short stroke cylinders and causes the pistons of each cylinder to descend, carrying with them the vacuum cups. When the long and short stroke pistons reach their furthest extension downwardly, the bottom end of the vacuum cups 66 are disposed on the upper surface of the tile thereunder, as shown in the dotted outline in FIG. 2. (Before the cylinders bottom out, the heads come into contact with mechanical guide means and stops 69 that seat and align the vacuum cups). A separate vacuum is then introduced to the vacuum cups in each set to secure the cups to a tile. Compressed air is then fed into each short stroke cylinder 62 to cause the piston thereof to retract upwardly into the cylinder, carrying with it its plurality of vacuum cups 66 and the tile. If the control circuit senses that the vacuum to one of the cups does not maintain the vacuum, it interprets this as a failure of that set of vacuum cups to bring with it the underlying tile. Accordingly, each of the short stroke cylinders is cycled a second time in the hope that a better contact will be made with the unlifted tile and that on the second attempt, each of the sets of vacuum cups will bring with it the underlying tile. If the second attempt is also abortive, then the unlifted tile or tiles are allowed to remain in place for subsequent manual removal.

Once the pistons of the short stroke cylinders are withdrawn, carrying with them any tiles lifted therewith, compressed air is automatically fed into the long stroke cylinder 60 to cause the piston thereof to retreat into the cylinder, thereby lifting the head 64, cups 66, and tiles into the machine to the position shown in full lines in FIG. 2. The sequential lifting enables short stroke, high force, heavy duty cylinders to initially break each tile free of the floor (with the vacuum cup arrangement actually peeling the tile from the underflooring by the outer edges inward) and the long stroke, low force, fast acting cylinder to further lift the freed tiles rapidly upward.

The vertically oriented long stroke cylinder 60 is horizontally slidably mounted on a horizontal guide rod 70 and secured to the piston of a horizontally oriented long stroke cylinder 72. Once the vertically oriented long stroke cylinder 60 has lifted the tiles to the proper height, as shown in full line in FIG. 2 (so that they will be able to pass over the side of the container 24), compressed air forces the piston of the horizontally oriented long stroke cylinder 72 rearwardly, moving the vertically oriented long stroke cylinder 60, the head 64, the short stroke cylinders 62, the vacuum cups 66 and the lifted tiles 74 rearwardly to reposition the lifted tiles 74 over the container 24, as shown in the dotted outline of tiles 74 in FIG. 2. At that point, the vacuum to the vacuum cups is released and the tiles allowed to drop into container 24. While the tile dropped into container 24 may be slightly curved when dropped, due to the lifting operation, the residual heat in the tile allows it to straighten while in the box, thereby allowing for a very densely packed container, efficient for shipping purposes.

The long stroke cylinders 60, 72 exert only about 150–200 pounds of pull, but this is more than sufficient as the short stroke heavy duty cylinders 62 perform the hard labor of freeing the tiles from the mastic. To complete the repositioning cycle, compressed air is fed into the horizontally oriented long stroke cylinder 72 to move its piston forwardly, back to its original position, bringing with it the lifting apparatus. Once the lifting apparatus is back in its original position, a "lifter ready" light 80 on the control panel 42 is illuminated to indicate that the lifting operation may be commenced again as soon as a new group of tiles has been heated.

The floor tile remover 10 includes two programmable logic controllers. The first controller controls temperatures using as inputs the desired heater temperature set on the control panel by the operator, the maximum desired temperature permitted for the tile (either as set by the operator or as factory set), the sensor which determines the temperature of the heater, and the sensor which determines the temperature of the tile. The other controller controls the tile lifting and repositioning apparatus, which lifts the heated tile from the subflooring and, after repositioning it, drops it into the container 24. The actual implementation of each of these controllers is well within the skill of a worker in the field and forms no part of this invention and need not be described in further detail. Further, many of the mechanical details of the embodiment of the invention illustrated herein would be well known to a worker in the field upon reading this specification. Therefore, for the sake of brevity, these various mechanical details have not been described.

Figures 1, 6, 7, 8:
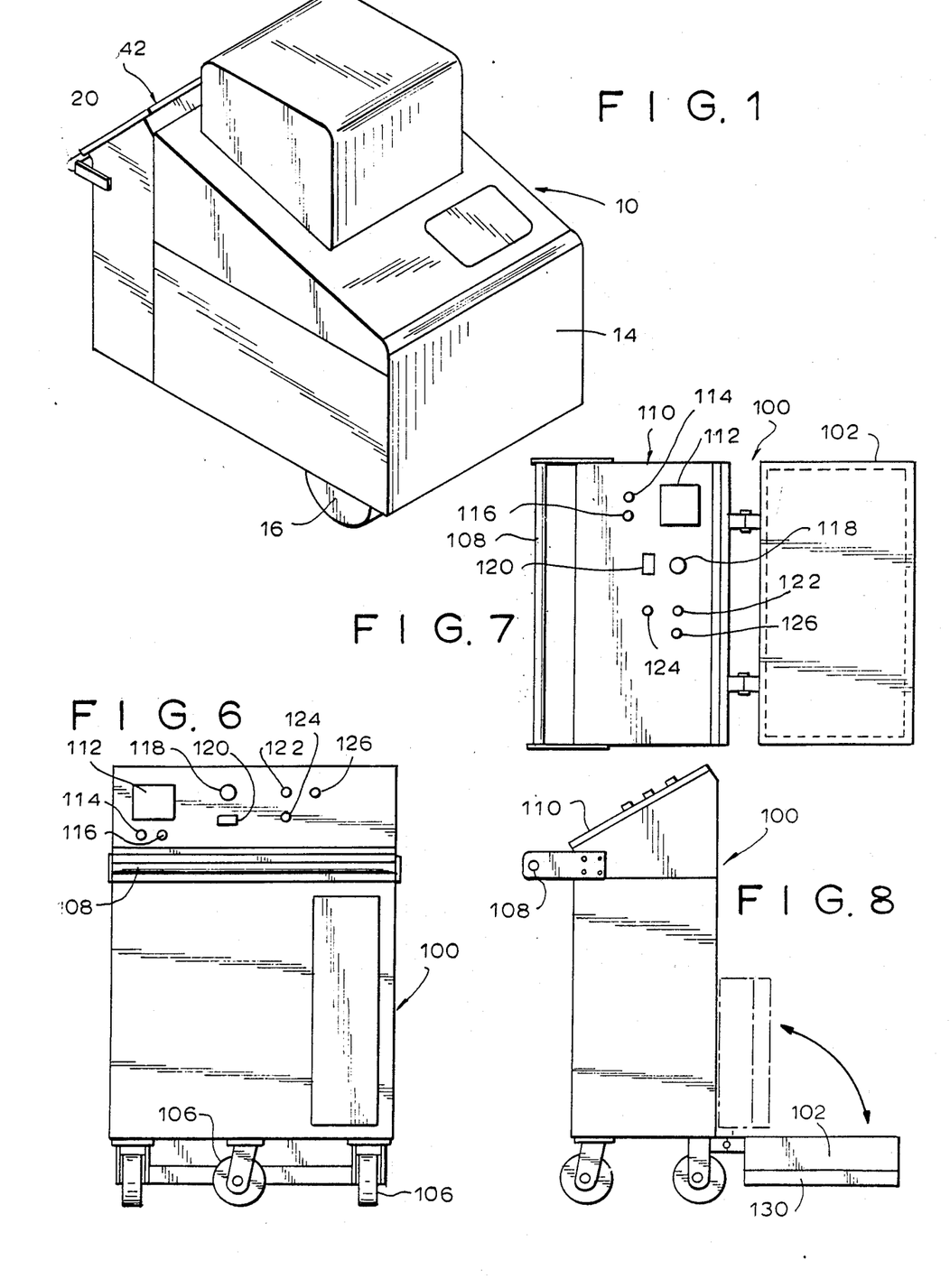
FIG. 1 is an isometric view of one embodiment of a floor tile remover according to the present invention.
FIG. 6 is a front view of a second embodiment of the floor tile remover according to the present invention.
FIGS. 7 and 8 are top plan and side elevation views, respectively, of the embodiment of the invention shown in FIG. 6.

It has been found that it is not necessary in many instances to provide a floor tile remover which both heats the floor tiles and has a system for automatically removing and storing the tiles. It has been found that in accordance with the broader aspects of this invention, in many applications it is sufficient to only provide for controlled heating of the tiles and manual removal of the tiles from the floor thereafter. FIGS. 6, 7 and 8 illustrate one embodiment of a floor tile remover, generally designated 100, in accordance with these broader aspects of the invention. Floor tile remover 100 includes a heater 102 for heating the floor tiles safely, thoroughly and uniformly, as well as a heating control system similar to that found on the larger floor tile remover 10. Floor tile remover 100 is lighter and smaller and hence more versatile and less expensive than floor tile remover 10.

Floor tile remover 100 may be used by itself (in conjunction with a subsequent manual tile removal operation) or as a supplement to floor tile remover 10 for use in those areas where the floor tile remover 10 cannot be productively utilized. For example, floor tile remover 10 has a substantially larger footprint or bottom plan area than floor tile remover 100 and thus cannot be used in tight locations (where width restrictions, turns, posts, columns, or the like preclude the use of apparatus of its size) or where the tiles to be removed are fractional tiles disposed adjacent a wall post or sideboard interfering with effective utilization of the lifting apparatus of the floor tile remover 10. Finally, floor tile remover 10 requires a compressed air source to perform the lifting and repositioning function and is optionally constructed so that the heating function cannot be performed unless the floor tile remover 10 is connected to a compressed air source. By way of comparison, floor tile remover 100 does not require a compressed air source for operation and hence is useful where floor tile remover 10 could not be used because of the absence of a compressed air source.

Turning now to FIGS. 6, 7 and 8, floor tile remover 100 includes a housing 104 supported for movement on wheels 106 and movable by the operator exerting force on handle 108. At the top of the housing is control panel 110, which has the same general layout of controls as floor tile remover 10, including tile temperature control 112 for controlling the temperature of the heater, heater on/off switch 114, tile over temperature indicator lamp 116, heater temperature control 118, timer 120, key on/off switch 122, on lamp 124 and emergency off switch 126. These various controls and lamps have the same functions as the comparable switches and lamps found in floor tile remover 10. Heater 102 is pivotably mounted to housing 104 so that it can be pivoted into the full line position shown in FIGS. 6, 7 and 8 to heat the tiles. When not in use, heater 102 can be pivoted upwardly (as shown in dotted line in FIG. 8) to protect the heater 102 during transportation to and from a work site and to minimize the space occupied by floor tile remover 100 in storage. As in floor tile remover 10, floor tile remover 100 has a sensor positioned with respect to heater 102 to sense the temperature of the heater and a sensor positioned to sense the temperature of the tile. The maximum tile temperature control is factory set, rather than operator set, and hence the setting means is not on control panel 110. In operation, it functions the same as the floor tile heating aspects of floor tile remover 10, and therefore, these operations need not be discussed again.

What has been described are two specific embodiments of the floor tile remover of the present invention. As will be readily apparent to those skilled in the art, modifications can be made to the respective embodiments without departing from the spirit and scope of the invention. For example, in the "heater only" embodiment of the invention, the heater need not be made pivotable but could be permanently positioned over the floor tiles. In all events, the invention is set forth in the amended claims, and the illustrative embodiments described above are understood to be only examples thereof.

We claim:

1. Apparatus for heating, lifting and storing floor tiles intact comprising:
   (A) a movable frame for progressive movement over a plurality of tiles to be heated successively, including means for removably receiving a storage container adapted to hold a plurality of tiles;
   (B) means mounted on said frame for heating a plurality of tiles on a subfloor to soften the tiles and any thermoplastic adhesive securing the tiles to the subfloor;
   (C) means for lifting each of the heated tiles by at least four widely spaced points adjacent the periphery of each heated tile simultaneously, said lifting means comprising in series an upper pneumatic cylinder and a plurality of lower pneumatic cylinders;
   (D) means for relocating the lifted tiles into the storage container; and
   (E) control means for controlling said heating, lifting and relocating means.

2. The apparatus of claim 1 wherein said heating means is an infrared heater.

3. The apparatus of claim 2 wherein said control means enables operation of said heating means on one plurality of tiles to overlap with operation of said lifting and relocating means on another plurality of tiles.

4. The apparatus of claim 1 wherein said control means causes said lifting means to attempt to lift the plurality of heated tiles a second time if the first time is unsuccessful.

5. The apparatus of claim 1 wherein said lifting means includes a head carrying a plurality of sets of spaced vacuum cups, said vacuum cups of a given set being disposed on said head to engage a respective tile at spaced points on the surface of the tile.

6. The apparatus of claim 5 wherein said head of said lifting means is replaceable by a head having a different disposition of vacuum cups to permit lifting and relocation of a plurality of tiles having a different configuration.

7. The apparatus of claim 1 additionally including means for moving said heating means between a first position substantially spaced above the level of the upper surface of the tiles and a second position closely adjacent the level of the upper surface of the tiles.

8. The apparatus of claim 1 wherein each of said lower cylinders is of greater diameter and shorter length than said upper cylinder, said lower cylinders being actuated to initially lift the tiles from the subfloor and said upper cylinder being actuated to lift said lower cylinders and hence the tiles after the tiles are lifted from the subfloor.

9. Apparatus for heating, lifting and storing asbestos floor tiles intact comprising:
   (A) a movable frame for progressive movement over a plurality of tiles to be heated successively, including means for removably receiving a storage container adapted to hold a plurality of tiles;
   (B) infrared heating means mounted on said frame for heating a plurality of tiles on a subfloor to soften the tiles and any thermoplastic adhesive securing the tiles to the subfloor;
   (C) means for lifting each of the heated tiles by at least four widely spaced points adjacent the periphery of each heated tile simultaneously; said lifting means including a head having at least four widely spaced vacuum cups for each tile of the plurality of tiles, said vacuum cups being disposed on said head to engage each tile at at least four widely spaced points adjacent the periphery of the tile; said lifting means comprising in series an upper pneumatic cylinder and a plurality of lower pneumatic cylinders, each of said lower cylinders being of greater diameter and shorter length than said upper cylinder, said lower cylinders being actuated to initially lift the tiles from the subfloor and said upper cylinder being actuated to lift said lower cylinders and hence the tiles after the tiles are lifted from the subfloor;
   (D) means for relocating the lifted tiles into the storage container; and
   (E) control means for controlling said heating, lifting and relocating means and for enabling operation of said heating means on one plurality of tiles to overlap with operation of said lifting and relocating means on another plurality of tiles.

* * * * *